United States Patent [19]

Winthrop

[11] Patent Number: 4,861,153

[45] Date of Patent: Aug. 29, 1989

[54] PROGRESSIVE ADDITION SPECTACLE LENS

[75] Inventor: John T. Winthrop, Wellesley, Mass.

[73] Assignee: American Optical Corporation, Southbridge, Mass.

[21] Appl. No.: 131,987

[22] Filed: Dec. 10, 1987

Related U.S. Application Data

[63] Continuation-in-part of Ser. No. 944,702, Dec. 19, 1986, abandoned.

[51] Int. Cl.$^4$ ................................................. G02C 7/06
[52] U.S. Cl. .................................................... 351/169
[58] Field of Search ............... 351/168, 169, 170, 171, 351/172

[56] References Cited

U.S. PATENT DOCUMENTS

| | | | |
|---|---|---|---|
| 2,878,721 | 3/1959 | Kanolt | 351/169 |
| 3,687,528 | 8/1972 | Maitenaz | 351/169 |
| 3,785,724 | 1/1974 | Cretin-Maitenaz | 351/169 |
| 4,056,311 | 11/1977 | Winthrop | 351/169 |
| 4,274,717 | 6/1981 | Davenport | 351/169 |
| 4,307,945 | 12/1981 | Kitchen et al. | 351/169 |
| 4,315,673 | 2/1982 | Guilino et al. | 351/169 |
| 4,514,061 | 4/1985 | Winthrop | 351/169 |
| 4,580,883 | 4/1986 | Shinohara | 351/169 |
| 4,606,622 | 8/1986 | Fuëter et al. | 351/169 |
| 4,640,593 | 2/1987 | Shinohara | 351/169 |

FOREIGN PATENT DOCUMENTS

| | | | |
|---|---|---|---|
| 583087 | 9/1959 | Canada | 351/169 |
| 7107504 | 6/1971 | Netherlands | 351/169 |

Primary Examiner—Bruce Y. Arnold
Assistant Examiner—Scott J. Sugarman
Attorney, Agent, or Firm—Fishman, Dionne & Cantor

[57] ABSTRACT

In the embodiments of the bipolar progressive power ophthalmic lens described in the specification, the constant power distance portion and reading portion regions of the progressive power surface are reduced to mathemtical points and the surface astigmatism aberration is reduced to a minimum level by spreading it over a maximally large area of the lens. The points are the poles of a bipolar system of isopower contours and the entire progressive surface is swept out by the curve of intersection formed between a sphere of variable radius and a corresponding circular cylinder of variable diameter with the dimensions of relative positions of intersecting sphere and cylinder chosen so as to produce a gently curving surface to provide a smooth optical effect.

38 Claims, 8 Drawing Sheets

PROGRESSIVE ADDITION SPECTACLE LENS

REFERENCE TO RELATED APPLICATION

This application is a continuation-in-part of my co-pending application, Ser.No. 944,702, filed Dec. 19, 1986 now abandoned.

BACKGROUND OF THE INVENTION

1. Field of the Invention

This invention relates to spectacle lenses, and, more particularly, to improvements in progressive lenses for the correction of presbyopia.

2. Description of the Prior Art

Presbyopia, or loss of accommodation of the eye with age, is classically treated by means of a spectacle fitted with bifocal or trifocal lenses. Alternatively, two pairs of single-vision spectacles, one for near vision and one for far vision (if necessary) may be prescribed. In recent years, the progressive addition spectacle lens has become an increasingly popular third approach to the management of presbyopia. Such lenses offer two distinct advantages over bifocals and trifocals: they provide a continuous range of accommodative powers, and they have no visible dividing lines.

But progressive lenses also have well-known disadvantages. In particular, the intermediate-power zone invariably exhibits unwanted lateral astigmatism and focusing error. In addition, such lenses usually exhibit skew distortion (loss of orthoscopy), as well as unwanted power and prismatic imbalance in binocular viewing. These aberrations are inherent (i.e., unavoidable in principle) and much effort has been expended in attempts to reduce or minimize their effect.

There is another defect of progressive lenses that is not often (if ever) mentioned. Most progressive lenses, despite the feature of progressively varying power, are designed along the lines of a standard trifocal. That is to say, the distance portion of the progressive surface is spherical and occupies the upper half of the lens, just like the distance portion of a solid-type (Executive) trifocal; the reading area, too, is spherical, and occupies a segment-shaped area separated some 15mm from the distance vision area. These spherical distance and near vision areas are connected by a progressive corridor (the midline of which being usually an umbilic), and the inherent aberrations of the lens are compressed into the areas laterally disposed to the progressive corridor and the reading area. Not only are these aberrations objectionably strong (because the area into which they are packed is small), but the transition between the distance and intermediate areas, and between the intermediate and reading areas, is marked by relatively sharp changes in all optical characteristics: mean power, astigmatism and prism. Thus, the visual field afforded by the typical progressive lens is by no means a smooth and continuous one; rather, it is divided into alternately clear and blurred areas. Lenses exhibiting these discontinuous optical characteristics may not be tolerated by some patients.

In summary, the following may be cited as principal goals in the design of a progressive lens:

1. Optically stable and aberration-free distance and near-viewing areas.
2. Progressive corridor of useful width and convenient length.
3. Minimized surface astigmatism.
4. Minimized lateral power error.
5. Minimized skew distortion.
6. Minimized binocular power and astigmatic imbalance.
7. Minimized binocular vertical prismatic imbalance.
8. Visual continuity, i.e., smooth and continuous optical effect.

Unfortunately, it is not possible to satisfy all design goals simultaneously, and design compromises are inevitable. Many forms of compromise are possible, each leading to a new design with its own peculiar features.

The progressive lens described in U.S. Pat. No. 4,056,311 (Winthrop, assigned to American Optical, 1977) features a spherical distance portion occupying the entire upper half of the lens and a large spherical reading portion. Consequently, the astigmatism within the intermediate area is highly compressed and of non-negligible magnitude. Provision is made for the correction of orthoscopy in the peripheral portions of the intermediate area, but this feature results in an undesirable concentration of aberration at the boundary between the corrected and uncorrected areas. The layout of this design is similar to that of a trifocal, and consequently the design lacks visual continuity.

The design put forward in U.S. Pat. No. 4,307,945 (Kitchen and Rupp, assigned to Itek, 1981) also features a spherical distance portion comprising the upper half of the lens, a large spherical reading portion, and correction for orthoscopy in the peripheral portions of the intermediate area. The astigmatism adjacent to the progressive corridor is reduced below normally-expected values by permitting astigmatism to occur at the midline of the corridor itself; however, the astigmatism that remains to either side of the corridor is by no means negligible. Aberrations are highly concentrated at the boundary between those areas that are and are not corrected for orthoscopy. This design, conceptually similar to the one previously described, lacks visual continuity.

The progressive lens design described in U.S. Pat. No. 4,315,673 (Guilino and Barth, assigned to Rodenstock, 1982) is similar to the two previously described designs in that it has a large, almost spherical distance portion and a large, almost spherical reading portion. In this design, less emphasis is placed on the maintenance of orthoscopy than in the two previously described designs. This permits slightly lower values of astigmatism and enables the astigmatism to be distributed more uniformly than in the previous two designs. Despite these improvements, the design still emulates the trifocal and consequently lacks overall visual continuity.

In Canadian Pat. No. 583,087 (Davenport), U.S. Pat. No. 4,274,717 (Davenport) and Netherlands Published Application 71-07504 (Biessels), similar progressive lenses are disclosed in which the progressive surface is divided into the three traditional viewing zones, with a large, spherical distance portion in the upper half of the lens, a large, spherical reading portion in the lower half, and a meridional progressive corridor connecting the distance and reading portions. In the Davenport construction the progressive surface is generated by portions of a family of circles developed by passing an inclined plane of constant inclination through a multiplicity of spheres. The Biessels construction is virtually identical except that the inclined plane may have varying inclination. With either lens the aberration level is substantial.

The progressive lens disclosed in U.S. Pat. No. 4,514,061 (Winthrop) reduces the astigmatism level of the traditional three-viewing-zone lens to an optimally low level by uniformly distributing the aberration in the intermediate zone through application of the Dirichlet principle. But this lens, like the lenses previously described, exhibits significant aberration and lacks visual continuity.

Each of the preceding designs (except for the lens of Biessels) is optically symmetrical about the corridor meridian. To enable the eye to track comfortably down the progressive corridor, the corridor of each lens must be inclined about 9° from the vertical when mounted in the frame. This, however, may lead to uncomfortable binocular inequity between the two lenses in off-axis viewing at the intermediate-power level. Some designs incorporate asymmetry about the corridor meridian in an effort to control these unwanted binocular effects.

In U.S. Pat. No. 3,785,724 (Maitenaz, assigned to Essilor, 1974), an asymmetric lens is described whose aim is to provide equal astigmatic effect binocularly at the intermediate and near power levels. However, the lens also features a spherical distance area comprising the upper half of the lens and a large spherical reading area. Consequently, although the astigmatic effects may be equalized binocularly, the magnitude of the astigmatism is objectionably strong. Moreover, the lens, being comprised of three distinct viewing zones in the manner of a trifocal, does not provide visual continuity.

The asymmetrical design disclosed in U.S. Pat. No. 4,606,622 (Fueter and Lahres, assigned to Zeiss, 1986) aims to reduce to tolerable values binocular prism imbalance between the two lenses. But this design, too, has an almost spherical distance portion comprising the upper half of the lens, and a large, almost spherical reading portion. Consequently, the astigmatism at the intermediate level reaches significant values. Moreover, such a design, for the reason noted previously, cannot provide visual continuity.

From U.S. Pat. No. 3,687,528 (Maitenaz, assigned to Societe des Lunetiers, 1972), it is known that the inherent astigmatism of progressive lenses can be reduced in magnitude by permitting it to extend into the peripheral areas of the distance portion. This reduction is attained at the price of introducing astigmatism and power error at the distance vision level. But the remaining astigmatism is by no means negligible. Moreover, despite the reduced levels of astigmatism, the structure of the design does not afford optimum visual continuity.

U.S Pat. No. 4,580,883 (Shinohara, assigned to Seiko, 1986) describes a progressive lens in which the progressive surface is again divided into the three traditional viewing zones: far, intermediate, and near. As in the design discussed in the previous paragraph, astigmatism is permitted in the peripheral portions of the far and near zones, and this feature helps to reduce the maximum astigmatism encountered in the intermediate zone. Additionally, the far and near vision zones are so constructed that orthoscopy is strictly maintained at all points of those two zones. But orthoscopy is not maintained within the intermediate zone. Consequently, this lens, consisting of three viewing zones alternately corrected and uncorrected for orthoscopy, does not fulfill the requirement of optical continuity.

U.S. Pat. No. 4,640,593 (Shinohara, assigned to Seiko, 1987) describes improvements to the designs mentioned in the previous paragraph when the refractive power of the far zone is strongly positive, as required for the strongly hypermetropic (far-sighted) patient. This involves the introduction of a "base curve factor" to compensate for oblique astigmatic effects incurred in off-axis viewing. It does not alter the basic design of three distinct viewing zones, alternately corrected and uncorrected for orthoscopy.

In U.S. Pat. No. 2,878,721 (Kanolt, assigned to Farrand, 1959), a lens is disclosed in which astigmatism levels have been reduced to relatively low values. This is achieved by distributing the astigmatism over the entire area of the lens. But the price paid is a heavy one: both the distance and near centers are objectionably astigmatic, and the power error at those levels is severe. Thus, while such a lens indeed displays visual continuity, too much has been sacrificed to attain it and such a lens would not be acceptable to a wearer.

Accordingly, it is the object of the invention to provide a progressive addition spectacle lens with the smoothest possible distribution of dioptric power and lowest possible level of unwanted astigmatism, with orthoscopy at least approximately preserved in the lateral margins of the lens, and which in all power zones satisfies realistic requirements on stability of power and binocular compatibility.

SUMMARY OF THE INVENTION

This and other objects are achieved in accordance with the invention by combining in a progressive lens the following features:

(A) The distance and near vision "areas" are in fact not areas at all, but comprise two mathematical points. In this way the strength of the unwanted surface astigmatism is reduced to a minimum level by distributing it over a larger-than-usual area, namely, the entire area of the lens.

(B) The distance and near power points are connected by an umbilic line of progressive dioptric power. The general form of the power progression along the umbilic is determined by (1) optical stability requirements in the immediate neighborhoods of the distance and near power points, and (2) the requirement that the progression be smooth. The property of smoothness is ensured by demanding that the mean square gradient of the progression, or of one of its higher derivatives, be a minimum.

(C) The distance and near portion power points comprise the poles of a bipolar system of surface power contours. The contours are selected in such a way as to achieve a smooth and pleasing distribution of surface power and astigmatism. The property of smoothness is achieved by requiring that the mean square gradient of a certain auxiliary function, a function closely related to the mean surface power, be a minimum.

Geometrically, the entire progressive surface can be considered to be generated by a generating curve C, which is the curve of intersection formed between a sphere of variable radius and a corresponding circular cylinder of variable diameter. The dimensions and relative positions of the intersecting sphere and cylinder are so chosen as to produce a gently curving surface ensuring smooth optical effect.

In this invention, maintenance of orthoscopy and binocular compatibility are not dealt with explicitly in the design process. Rather, these desirable features of the invention emerge as automatic consequences of the feature of minimized aberration and power gradient. Moreover, acceptable binocular performance is achieved without resorting to asymmetrical construction. BRIEF DESCRIPTION OF THE DRAWINGS Further objects and advantages of the invention will become apparent from a reading of the following description when taken in conjunction with accompanying drawings, in which.

DESCRIPTION OF PREFERRED EMBODIMENTS

Bipolar progressive power lenses in accordance with the present invention may be made of glass or plastic material having a uniform index of refraction. In the embodiments of the invention described herein, the changing curvatures required for progressive power variation are confined to the convex side of the lens, with the concave side being reserved for prescription grinding in the usual way and the convex side of the lens will hereafter be referred to as the "progressive surface". However, the invention is not limited to lenses having convex progressive surfaces and is applicable equally to lenses having concave progressive surfaces.

The lens design which comprises the present invention is an improvement over earlier designs, and for a better understanding of the present design reference is made to the prior art where Canadian Patent No. 583,087 is exemplary.

Figure 1A:
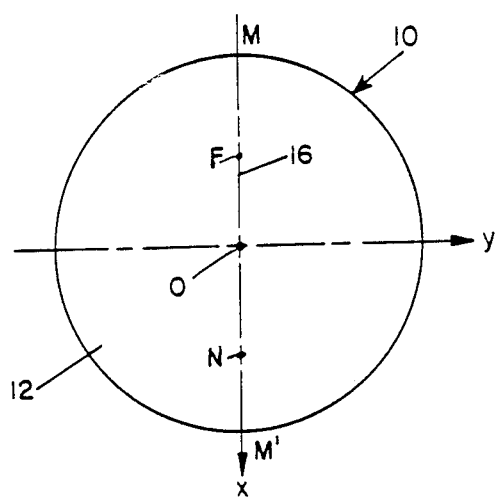
FIGS. 1A and 1B are views, in vertical elevation and cross section respectively, of a representative progressive power ophthalmic lens of a type known in the prior art.
Figure 1B:
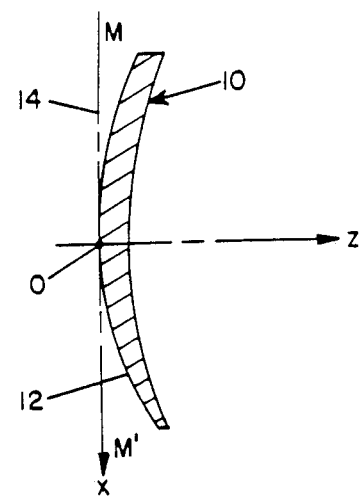

Referring to FIGS. 1A and 1B of the drawings, a prior art lens 10 has a progressive surface 12 which is tangent to a vertical plane 14 at the geometrical center O and a second vertical plane 16 passes through the center O at right angles to the first vertical plane dividing the lens into two symmetrical halves. The second plane 16 is called the principal vertical meridian, and its curve of intersection is designated MM' in FIG. 2 in which the progressive surface is represented by the meridanline 18.

The functional requirements of a progressive lens dictate that the surface along the meridian line and its partial derivatives, at least through second order and preferably through third order, must be continuous. To provide for progressive power variation, the curvature of the meridian line increases continuously in a predetermined manner from a minimum value in the upper half of the lens to a maximum value in the lower half. This variation of curvature along the vertical meridian is called the meridional power law.

Figure 2:
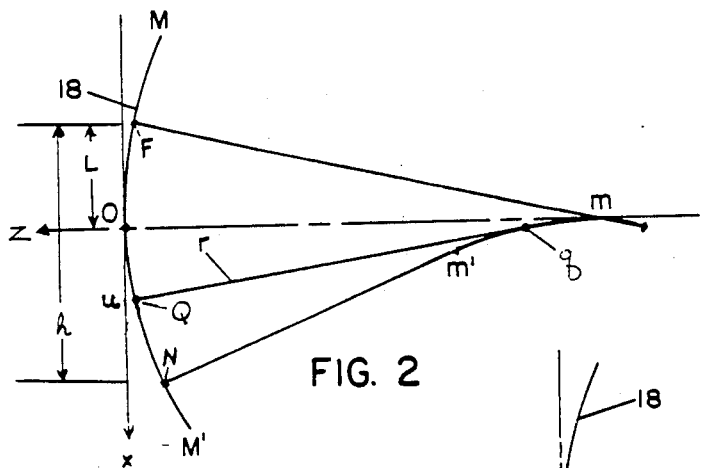
FIG. 2 is a graphical representation illustrating the evolute of the meridional line of the lens of FIGS. 1A and 1B.

The locus of the centers of curvature of the meridian line 18 shown in FIG. 2 comprises a continuous plane curve mm' called the evolute of the meridian line 1. For each point Q of the meridian line there exists a corresponding point q on the evolute. The radius vector qQ connecting two corresponding points (Q, q) is perpendicular to the meridian line 18 at Q and tangent to the evolute mm' at q.

Figure 3:
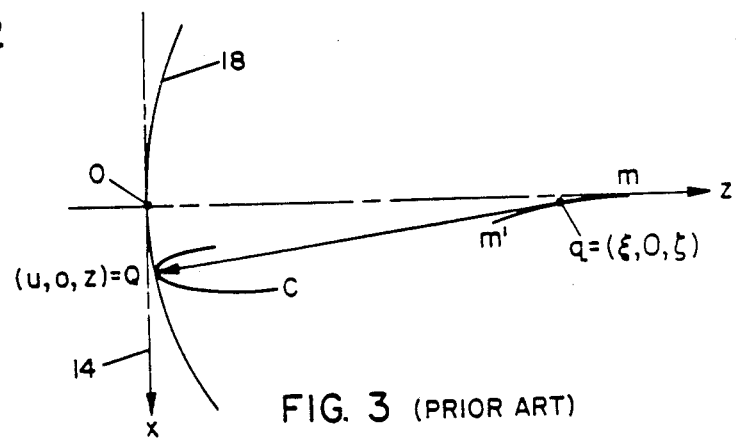
FIG. 3 is a graphical illustration showing the construction of a progressive surface of the lens of FIGS. 1A and 1B.

FIG. 3 illustrates the construction of a representative progressive power lens. The progressive surface is generated by a circular arc C having a horizontal orientation and a variable radius which passes successively through each point Q of the meridian line 18. Specifically, the generator C through a given point Q is defined as the line of intersection formed between a sphere of radius Qq centered at q and a horizontal plane through Q. Thus, the complete progressive surface may be considered to be generated, or swept out, by the line of intersection C between a sphere of variable radius and a corresponding horizontal plane of variable height. In consequence of this construction, the principal curvatures at each point Q of the meridian line are equal, with the result that the surface is free of astigmatism at the meridian line.

The progressive surface 12 of this prior art lens is readily described in algebraic terms. A rectangular coordinate system illustrated in FIG. 1 is defined whose origin coincides with 0, and whose x-y plane coincides with the tangent plane at 0. The x-axis points downward in the direction of increasing optical power. In this system, the z-axis is normal to the surface at 0, and the equation of the surface 12 may be written in the form $z = f(x,y)$.

Letting u denote the x-coordinate of a point Q on the meridian line, the coordinates $(\xi, \eta \zeta)$ of the corresponding point q on the evolute may be expressed as a function of the parameter u:

$$\xi = u - r \sin \theta \quad (1)$$

$$\eta = 0$$

$$\zeta = r \cos \theta + \int_0^u \tan\theta \, du$$

-continued where $$\sin \theta = \int_0^u du \quad (2)$$

and $r=r(u)=qQ$. It is to be noted that $\sin \theta = 0$ when $u=0$, so that the progressive surface is tangent to the x-y plane at the origin O.

The equation of the sphere of radius $r(u)$ centered at Q expressed as an elevation with respect to the x-y plane may be written:

$$z = \zeta(u) - \{r(u)^2 - [x-\xi(u)]^2 - y^2\}^{\frac{1}{2}} \quad (3)$$

The equation of a horizontal plane through Q is:

$$x = u \quad (4)$$

Equation (3) represents a family of spheres, and equation (4) a family of parallel planes. The members of each family are generated by the single parameter u. For each value of u there exists a unique sphere and a plane that intersects it. The curve of intersection between the sphere and plane surface is denoted C and is shown in FIG. 3. When u is varied between its maximum and minimum values, the curve C is caused to sweep out the complete progressive surface. By eliminating u between equations (3) and (4), a single, nonparametric, algebraic equation of the surface is produced: $z=f(x,y)$, where $$f(x,y) = \zeta(x) - \{r(x)^2 - [x-\xi(x)]^2 - y^2\}^{\frac{1}{2}} \quad (5)$$

Figure 4:
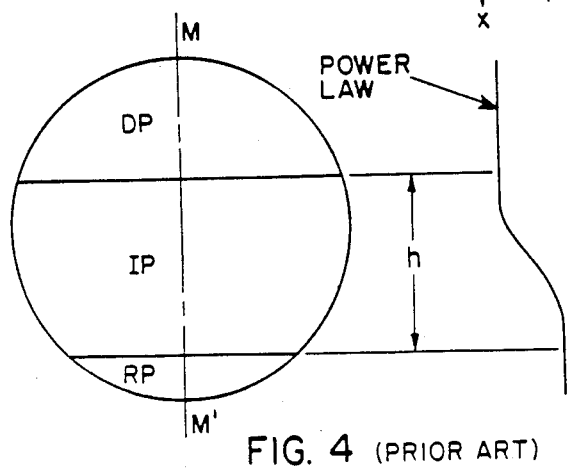
FIG. 4 is a vertical elevational view of the prior art progressive power ophthalmic lens showing various viewing zones thereof and a graphical representation of the associated power law.
Figure 5A:
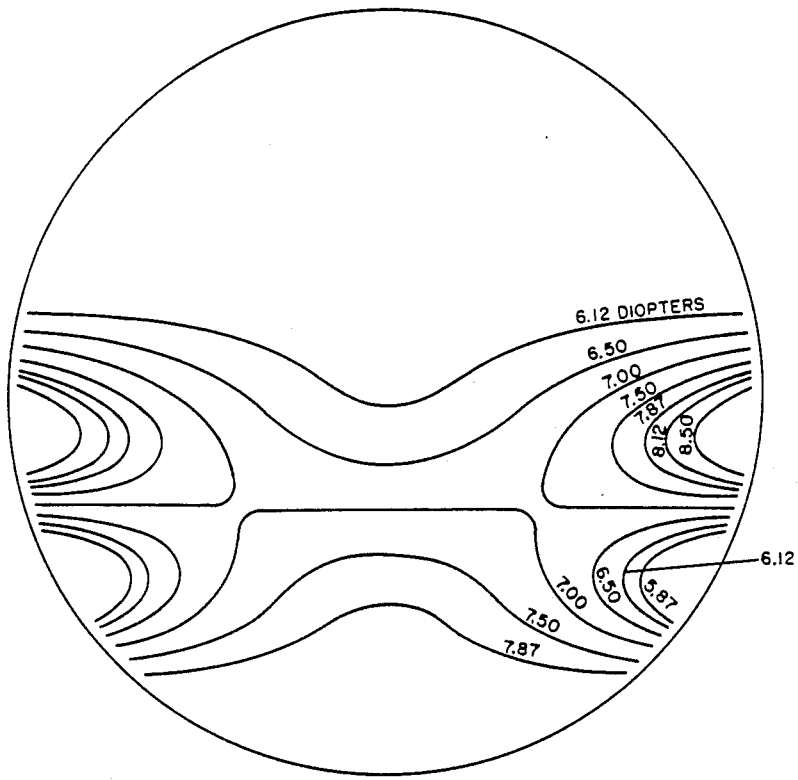
FIGS. 5A, 5B and 5C depict, respectively, contours of constant mean surface power, contours of constant surface astigmatism, and an isometric plot of surface astigmatism corresponding to the prior art lens of FIG. 4.
Figure 5B:
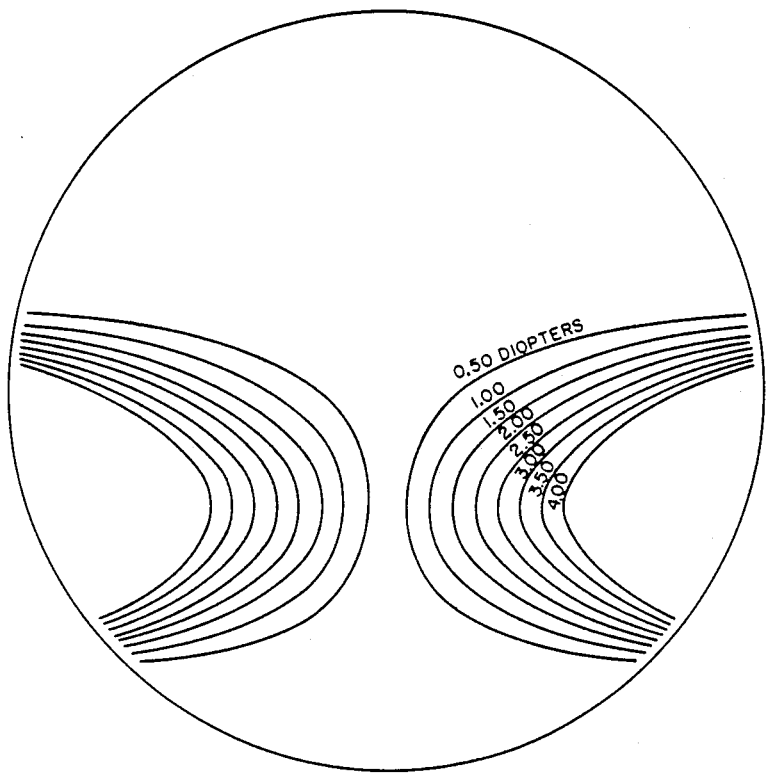
Figure 5C:
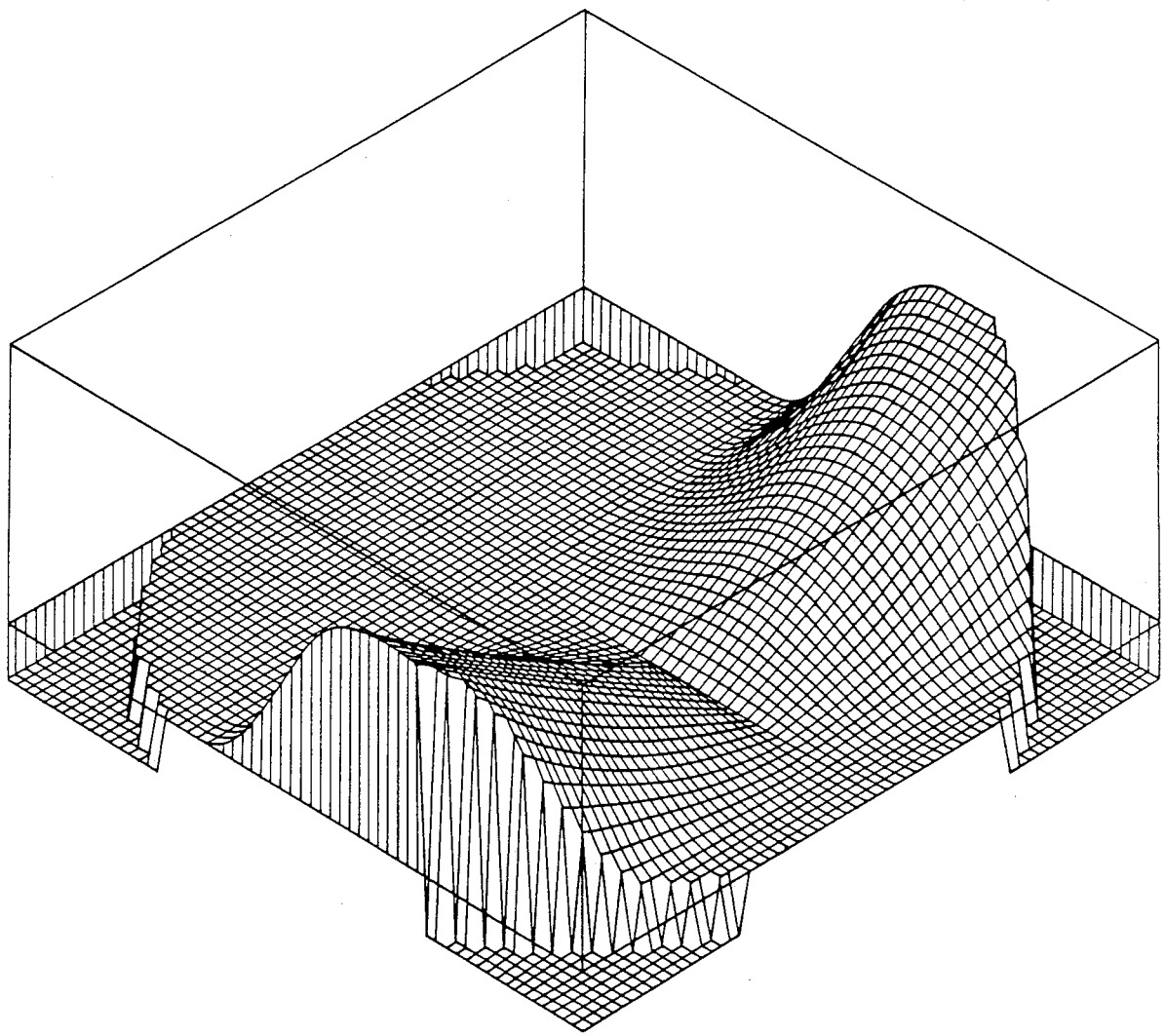

If the meridional power law of lens 10 has the conventional form illustrated in FIG. 4, then the DP and RP areas of the design are spherical and extend over the full width of the lens. Such a design provides full distance and reading utility but, as is well known, the astigmatism in the intermediate area is unacceptably strong. The surface power and astigmatism characteristics of this prior art lens are depicted in FIGS. 5A, 5B and 5C.

Many other design variations in the boundaries of the spherical DP and RP zones have been illustrated in the previously cited references, but in each of these the modified spherical DP and RP zones are of finite size and such lenses do not reduce the unwanted astigmatism to the maximum possible extent.

In accordance with the present invention, a progressive power spectacle lens with the smoothest possible distribution of dioptric power and lowest possible level of unwanted astigmatism is achieved by reducing the areas occupied by the spherical DP and RP to zero. In other words, the DP and RP of the present invention, strictly speaking, are mathematical points, not areas. This construction is illustrated schematically in FIG. 6 wherein the points F and N comprise the poles of a bipolar system of optical power.

Figure 7A:
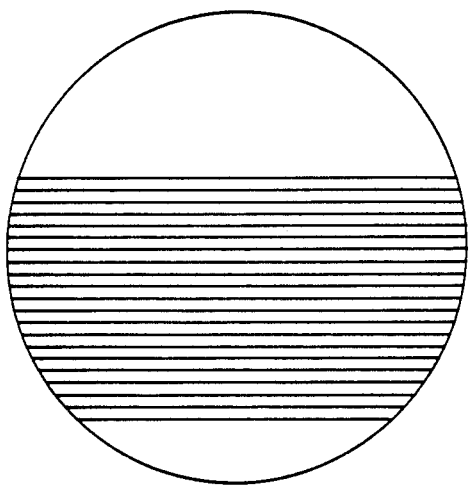
FIGS. 7A and 7B are contour plots demonstrating a geometrical transformation from a prior progressive lens to one representative of the present invention.
Figure 7B:
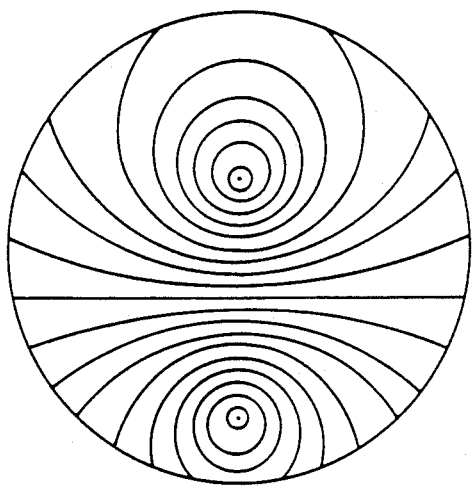

With the DP and RP zones having been reduced to mathematical points, the proper form of the progressive surface that surrounds them must be determined. This is accomplished conceptually by applying a geometrical transformation from the prior art, the nature of which is illustrated in FIGS. 7A and 7B. In FIG. 7A a prior art lens is illustrated showing the intersections of members of the family of planes $x=u$ with the x-y plane. These intersections form a family of parallel straight lines, which are, in turn, parallel to the straight-line DP and RP boundaries. As FIG. 7B indicates, in passing to an embodiment of the present invention, in which the DP and RP are points, the family of parallel straight lines transforms into a family of circular arcs of varying radii. The circular arcs of the lens illustrated in FIG. 7B represent the intersections of a one-parameter family of circular cylinders with the x-y plane. For each member of the original family of planes, there exists a corresponding member of the family of cylinders. Corresponding members of the families of intersecting spheres and cylinders intersect in a generating curve C. Moreover, these corresponding members are identified by the same parameter u, where u is the x-coordinate of a point Q on the meridian line of either lens. By varying the parameter u between its maximum and minimum values, the curve C is caused to sweep out the complete progressive surface of the invention.

An algebraic equation for the new surface analogous to equation (5) is readily obtained. The equation of any member of the family of cylindrical surfaces may be written in the form:

$$x = g(y,u) \quad (6)$$

This equation may be solved for the parameter u, giving an equation of the form:

$$u = h(x,y) \quad (7)$$

which reduces to equation (4) in the case of the art lens. The equation of the progressive surface of the new lens is obtained by eliminating the parameter u between equation (7) and (3). Explicitly, $$f(x,y) = \zeta[h(x,y)] - (\{r[h(x,y)]\}^2 - \{x - \xi[h(x,y)]\}^2 - y^2)^{\frac{1}{2}} \quad (8)$$

The detailed form of the resulting progressive surface will naturally depend on the form of the progression of power along the umbilic meridian line, and on the spacing of the circular cylinders represented by equation (6). To satisfy the aims of the invention, meridional power progression and the spacing of the cylindrical surfaces must be chosen so as to produce a gently curving surface, thereby ensuring a smooth optical effect.

As stated above, the form of the progression of power along the curve FN is determined by two factors: (1) optical stability requirements near points F and N, and (2) the requirement that the progression $k(u)=1/r(u)$ be a smooth function of the parameter u.

(1) An area of optical stability is one in which the dioptric power does not change appreciably. The required size of the stable area surrounding F or N will naturally depend on the intended application of the spectacle. For example, a spectacle lens intended for general use will require a larger stable far-viewing area, and a smaller stable near-viewing area, than will an occupational lens specifically designed for close work.

The size of the stable area surrounding F in the present invention depends essentially on the rate of growth of the curvature $k(u)$ as a function of distance from F. The slower the rate of growth, the larger the stable far-viewing area. Similarly, the slower the rate of growth of $k(u)$ as a function of distance from N, the larger the stable near viewing area.

Let $k(u)$ possess derivatives to all orders. Then the rates of growth of $k(u)$ at F and N can be related to the orders of the first non-vanishing derivatives at those points. (In the series $au^4 + bu^5$, the first non-vanishing derivative at $u=0$ is the 4th order derivative.) The higher the order of the first non-vanishing derivative, the slower the rate of growth. For instance, a function $k(u)$ whose first non-vanishing derivative at F is $d^8k/du^8$ will exhibit a slower rate of growth than will one whose first non-vanishing derivative is $d^2k/du^2$. By appropriately selecting the orders of the first non-vanishing derivatives at F and N, one controls the sizes of the stable far- and near-viewing areas.

(2) To satisfy the aims of the invention, the function $k(u)$ is to be the smoothest function of u consistent with the behavior of the function and its derivatives at F and N. As a criterion of smoothness, one might reasonably demand that the mean square gradient of $k(u)$ be a minimum; or in other words, that $k(u)$ minimize the Dirichlet integral:

$$I = \int_F^N |k'|^2 du, \qquad (9)$$

where $k' = dk(u)/du$, subject to the conditions $k(F) = k_1$ and $k(N) = k_2$. This integral is of the form:

$$I = \int_F^N f(u,k,k')du, \qquad (10)$$

which is rendered a minimum by a function $k(u)$ satisfying the Euler-Lagrange equation, $$\partial f/\partial k - (d/du)(\partial f/\partial k') = 0, \qquad (11)$$

which, since $f = |k'|^2$ reduces to:

$$k'' = 0. \qquad (12)$$

Hence $$k(u) = c_0 + c_1 u \qquad (13)$$

where $c_0$ and $c_1$ are constants determined by the values of k at F and N. Thus the function corresponding to the smoothness criterion (9) is a linear function of u. Criterion (9) does not apply to functions whose first non-vanishing derivatives at F and N are of order 2 or higher. A more general smoothness criterion is required.

Let m and n denote the orders of the first non-vanishing derivatives of k at F and N, respectively. Let $p = m + n$. Then, in place of (9), one requires that k minimize the integral:

$$I = \int_F^N |d^{p-1}k/du^{p-1}|^2 du. \qquad (14)$$

Figure 9:
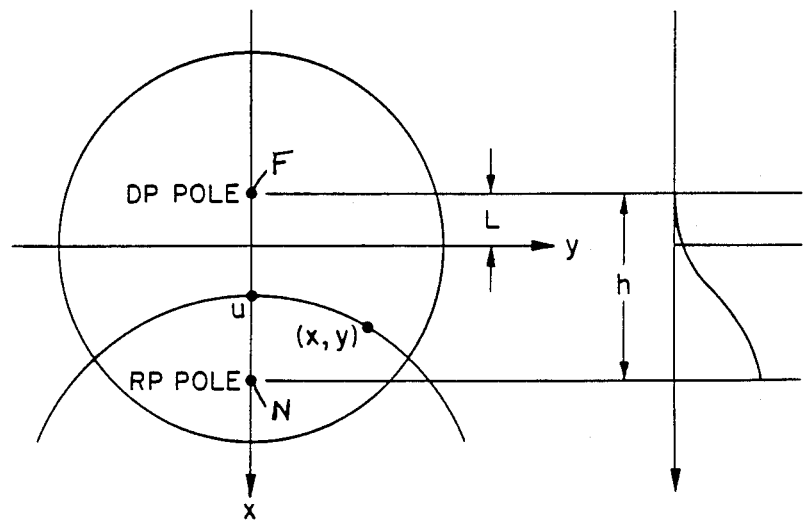
FIG. 9 is a graphical representation depicting the layout of a typical lens constructed according to the present invention and incorporating an eighth-order meridional power law.

The function k that renders (14) a minimum is given by the Euler-Lagrange equation:

$$d^p k/du^p = 0, \qquad (15)$$

the solution of which is the p-1 order polynomial:

$$k(u) = \sum_{n=0}^{p-1} c_n u^n \qquad (16)$$

in which the p coefficients are determined by the p endpoint conditions. If $k_F$ and $k_N$ denote the curvatures at F and N, respectively, and if F is located at $u = L$ as shown in FIG. 9, equation (16) may be rewritten in the form:

$$k(u) = k_F + (k_N - k_F)\sum_{n=1}^{p-1} c_n(u+L)^n \qquad (17)$$

[The $c_n$ in this equation are not the same as those in (16).] Equation (17) defines the smoothest curvature function $k(u)$ consistent with the given endpoint conditions.

Having defined the far- and near-viewing "areas" by the points F and N, and having specified the form of the power law $k(u)$ between those points, it remains to specify the form of the progressive surface over the remainder of the lens. To satisfy the aims of the invention, the power and astigmatism are to be distributed as smoothly as possible over the area of the lens. To accomplish this, it seems at first reasonable to identify the curves of intersection C between corresponding members of the intersecting spheres and cylinders with curves of constant mean surface curvature, $\bar{k}(x,y)$, and to fix their spacing by demanding, as in the case of the meridional power law, that k minimize the Dirichlet integral:

$$I = \int |\bar{k}_x^2 + \bar{k}_y^2| dx dy \qquad (18)$$

where the subscripts x and y denote partial derivatives with respect to those variables. This approach, however, is not mathematically feasible. Instead, it is convenient to work, not with the mean curvature $\bar{k}$, but with the auxiliary function $\phi(x,y)$.

Figure 8:
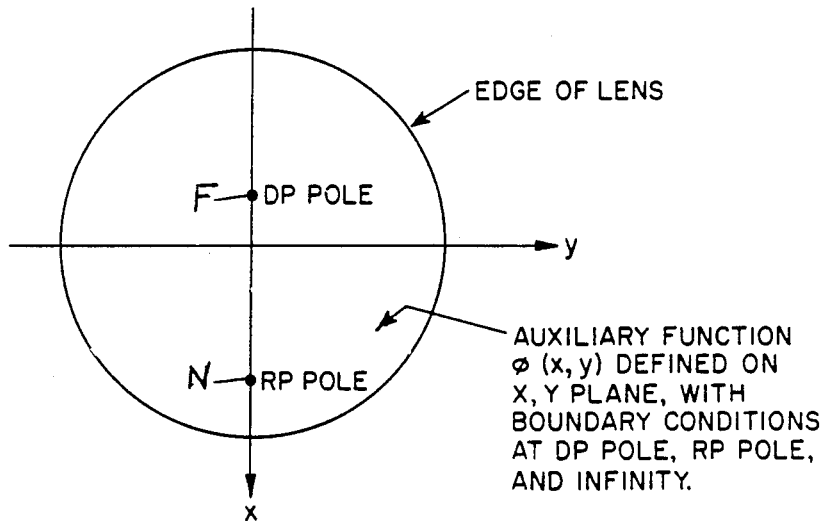
FIG. 8 is a graphical representation schematically illustrating a development of cylindrical surfaces to satisfy the aims of the present invention.

As illustrated in FIG. 8, the auxiliary function $\phi(x,y)$ is defined on the x-y plane. The function $\phi$ does not represent the progressive surface itself, but is used to define the spacing of the cylindrical surfaces. This function takes on the following boundary values:

$$\begin{aligned}\phi(x,y) &= c_1 \text{ when } (x,y) + DP \text{ pole, } F \\ &= c_2 \text{ when } (x,y) + RP \text{ pole, } N \\ &= 0 \text{ at infinity,}\end{aligned} \qquad (19)$$

where $c_1$ and $c_2$ are constants. The smoothest function $\phi(x,y)$ consistent with these boundary conditions is deduced from the following considerations:

If the problem were one-dimensional, rather than two-dimensional, it would be obvious that if $\phi(x)$ has the boundary values $\phi(0) = c_1$ and $\phi(1) = c_2$, then the smoothest function $\phi(x)$ between $x=0$ and $x=1$ would be the linear function $\phi(x) = c_1 + (c_2 - c_1)x$. This function satisfies the differential equation:

$$\frac{d^2\phi}{dx^2} = 0 \qquad (20)$$

Thus, the required function $\phi(x,y)$ in the two-dimensional case satisfies the two-dimensional Laplace equation:

$$\left(\frac{\partial^2}{\partial x^2} + \frac{\partial^2}{\partial y^2}\right)\phi(x,y) = 0 \qquad (21)$$

which is to be solved subject to the boundary conditions (19). Functions satisfying equation (21) are called harmonic functions.

The preceding result may be deduced in a more rigorous way. A criterion for smoothness is to require that the average values of the moduli of the derivatives $\partial\phi/\partial x$ and $\partial\phi/\partial y$ be a minimum. Alternatively, if the average sum of the squares of these quantities is considered, i.e., the Dirichlet integral $$\int_{-\infty}^{+\infty}\int_{-\infty}^{\infty}\left(\left(\frac{\partial\phi}{\partial x}\right)^2+\left(\frac{\partial\phi}{\partial y}\right)^2\right)dx\,dy, \quad (22)$$

then, according to the Euler-Lagrange variational calculus, equation (22) is minimized when $\phi(x,y)$ satisfies Laplace's equation, equation (21). The fact that equation (22) is minimized by a function satisfying Laplace's equation is known as Dirichlet's principle, or the principle of minimum potential energy. The Dirichlet principle accounts for the distribution of electrical potential around a charged electrical conductor, as well as the steady-state distribution of temperature in a thermal conductor. Such naturally-occurring distributions are smooth in the sense that the fields defining them minimize the Dirichlet integral. As will be demonstrated, a progressive lens whose surface derives from the Dirichlet principle likewise exhibits the property of smoothness.

To make use of the auxiliary function $\phi(x,y)$, one forms the so-called level curves, $$\phi(x,y)=c=\text{const.}, \quad (23)$$

which are curves of constant $\phi$-value. These curves may be expressed in the form given by equations (6) or (7) and therefore may be taken to represent the required family of cylinders.

Figure 6:
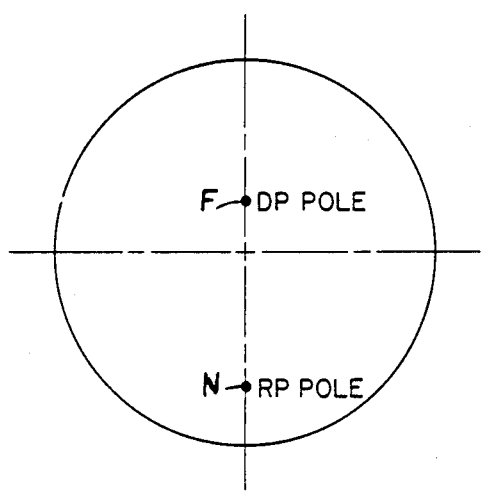
FIG. 6 is a vertical elevation view illustrating the location of the poles of the bipolar system of optical power characterizing a representative lens in accordance with the present invention.

For the bipolar configuration depicted in FIGS. 6 and 9, the solution of Laplace's equation, subject to conditions (19), is particularly simple. The curves of constant $\phi$ coincide precisely with the circular coordinate lines of a cylindrical bipolar coordinate system. Let the poles of the coordinate system be separated by the distance h, with the DP pole displaced a distance L above the origin O, as shown in FIG. 9. If the level curve through an arbitrary point (x,y) intersects the x-axis at the point u(x,y), then, after calculation, it is found that $$u = \frac{h}{2} - L + g - (\text{sgn } p)\left(g^2 - \frac{h^2}{4}\right)^{\frac{1}{2}} \quad (24)$$

where $$g = (\tfrac{1}{2})\left(p + \frac{y^2 + h^2/4}{p}\right) \quad (25)$$

and $$p = x - \frac{h}{2} + L \quad (26)$$

This expression for u(x,y), when inserted in equation (3), provides a complete algebraic specification of the progressive surface of a bipolar lens according to the invention. Different embodiments are generated by varying the form of the meridional power law $r=r(u)$.

In summary, the bipolar progressive surface f(x,y) is specified by the following set of equations:

$$z = f(x,y)$$
$$= \zeta(u) - \{r(u)^2 - [x - \xi(u)]^2 - y^2\}^{\frac{1}{2}}$$

where $$\xi(u) = u - r(u)\sin\theta(u),$$

$$\zeta(u) = r(u)\cos\theta(u) + \int_0^u \tan\theta(u)\,du,$$

$$\sin\theta(u) = \int_0^u \frac{du}{r(u)},$$

$$u = \frac{h}{2} - L + g - (\text{sgn } p)(g^2 - h^2/4)^{\frac{1}{2}},$$

$$g = (\tfrac{1}{2})\left(p + \frac{y^2 + h^2/4}{p}\right),$$

$$p = x - \frac{h}{2} + L,$$

h = vertical distance between DP and RP poles,
L = vertical displacement of DP pole above origin O, and the meridional power law is an Nth order polynomial, $$\frac{1}{r(u)} = \frac{1}{r_D} + \left(\frac{1}{r_R} - \frac{1}{r_D}\right)\sum_{n=1}^{N} c_n(u + L)^n,$$

$r_D$ = radius of curvature of the progressive surface at the DP pole,
$r_R$ = radius of curvature of the progressive surface at the RP pole, and
$c_n$ = constant coefficients.

FIRST NUMERICAL EXAMPLE

A typical example of a lens constructed according to the above principles in accordance with the invention, and suitable for general use, will now be given.

The lens is characterized by an eighth-order polynomial power law, depicted in FIG. 9, and defined by the equation:

$$\frac{1}{r(u)} = \frac{1}{r_D} + \left(\frac{1}{r_R} - \frac{1}{r_D}\right)\sum_{n=1}^{8} c_n(u + L)^n \quad (27)$$

where $$\begin{aligned}
c_1 &= c_2 = c_3 = c_4 = 0, \\
c_5 &= 56/h^5, \\
c_6 &= -140/h^6, \\
c_7 &= 120/h^7, \\
c_8 &= -35/h^8.
\end{aligned} \quad (28)$$

Note that $1/r = 1/r_D$ when $u = -L$ (DP pole), and $1/r = 1/r_R$ when $u = -L + h$ (RP pole). The quantity $$A = (n - 1)\left(\frac{1}{r_R} - \frac{1}{r_D}\right) \quad (29)$$

where n is the index of refraction of the lens material, represents the "addition power" of the multifocal lens. This particular power law provides gradually varying surface power in the neighborhoods of the DP and RP poles. The lens thus provides adequate focal stability for the distant and near visual fields.

The progressive surface defined by the power law of equation (27) will now be evaluated for a lens having a reading addition of 2.00 diopters. The lens is assumed to have an index of refraction of 1.498, and the following values of the parameters are assumed:

$h = 37.71$ mm $L = 10.65$ mm $r_D = 83.00$ mm $r_R = 62.25$ mm (30)

Figure 10A:
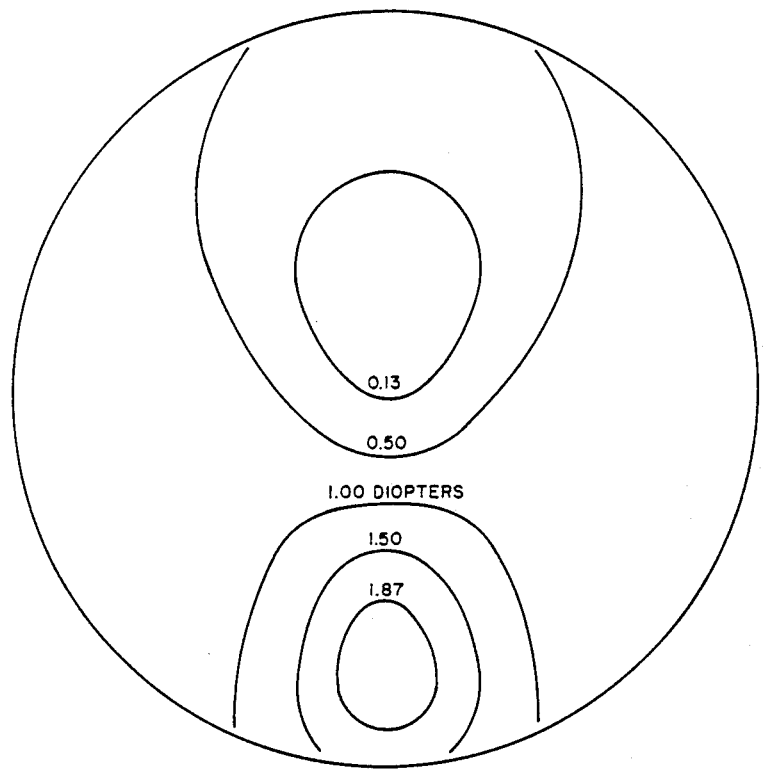
FIGS. 10A, 10B and 10C depict, respectively, contours of constant mean surface power, contours of constant surface astigmatism, and an isometric plot of surface astigmatism corresponding to the typical design of FIG. 9.
Figure 10B:
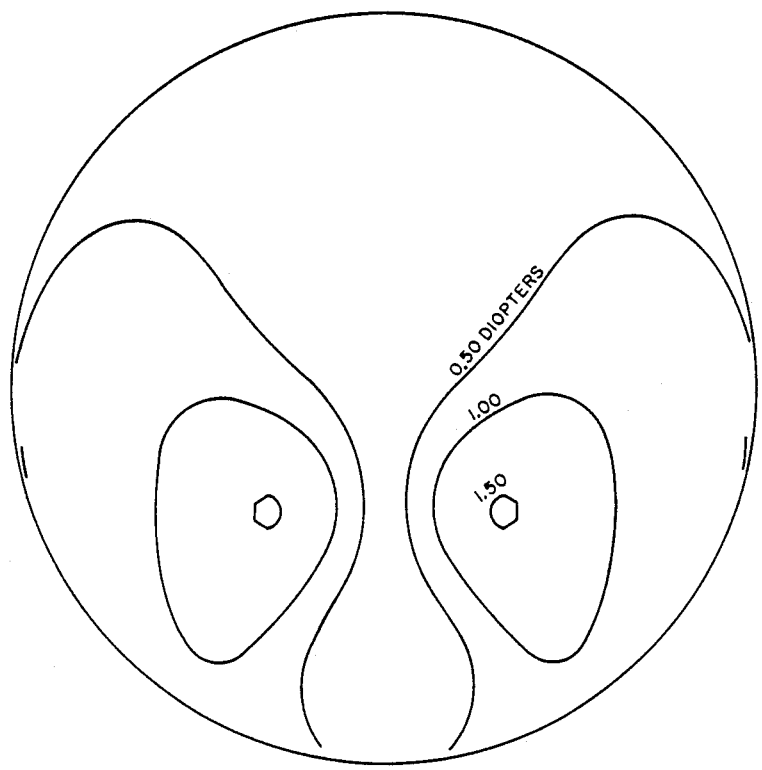
Figure 10C:
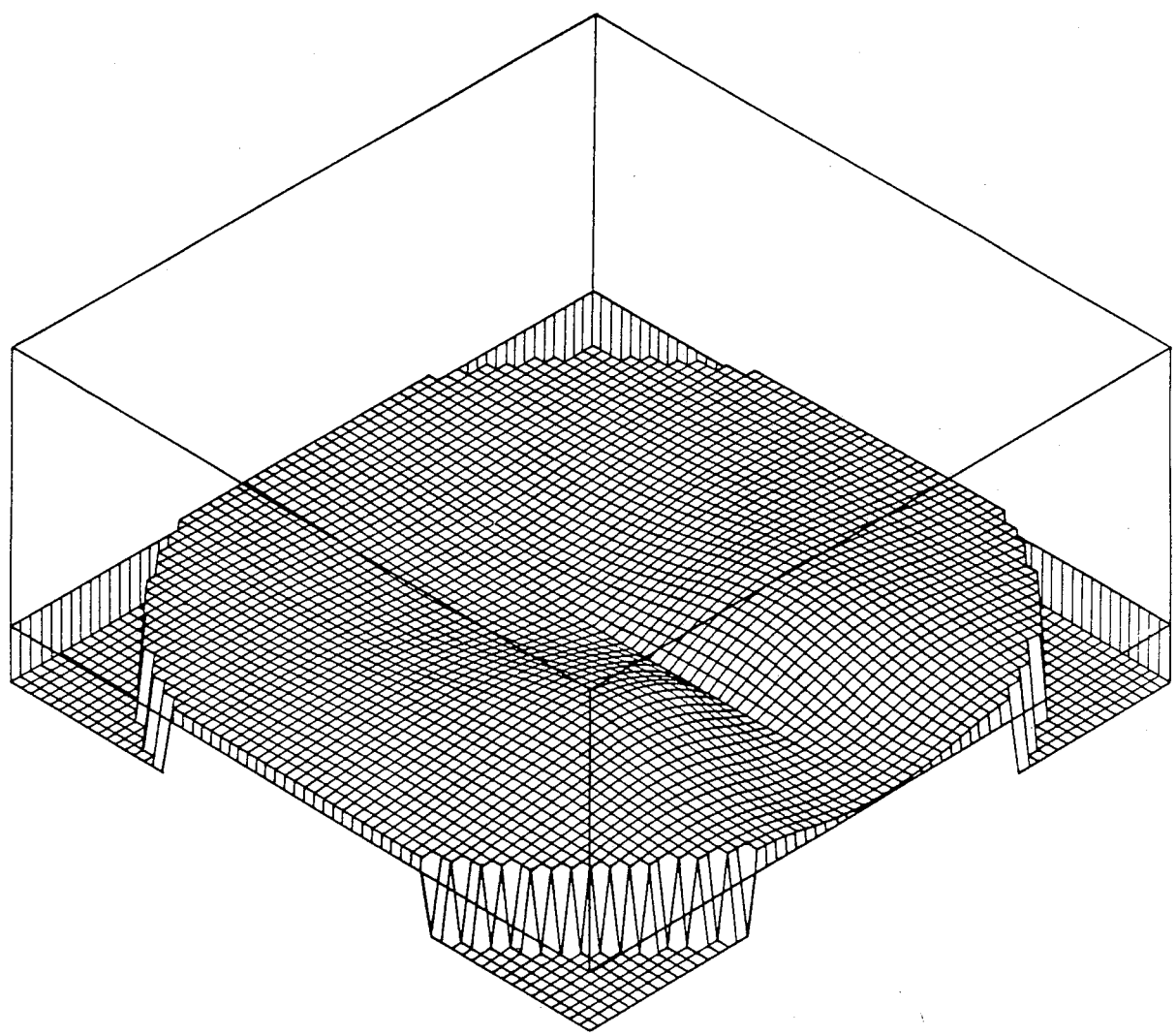

FIGS. 10A, 10B and 10C show the results of an electronic computer evaluation of the equations, using the given values of the parameters. FIG. 10A gives the contours of constant mean surface power; FIG. 10B gives the contours of constant surface astigmatism; and FIG. 10C provides a three-dimensional view of the distribution of surface astigmatism. Inspection of these diagrams shows that the power and astigmatism characteristics of the lens are smooth and slowly varying. The minimum progressive corridor width, as measured between lines of 1.0 diopter astigmatism, is about 9 mm. In addition, the surface astigmatism reaches a maximum value of just 1.51 diopters; this is about 0.4 diopter less astigmatism than that of any other 2.00 diopter addition progressive lens presently available. This example thus meets the goals of the invention.

SECOND NUMERICAL EXAMPLE

Figure 11:
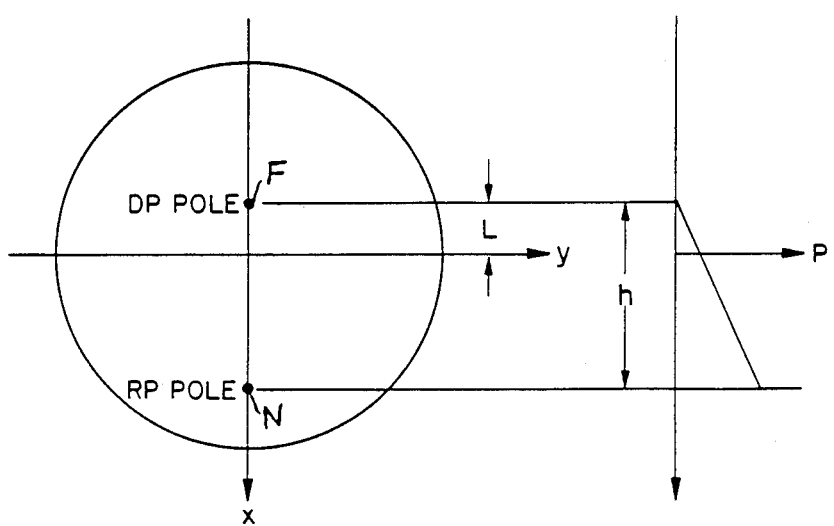
FIG. 11 is a graphical representation depicting the layout of a typical lens constructed according to the principles of the invention and incorporating a linear meridional power law.

The next example is that of a lens possessing what may be the lowest level of astigmatism possible in a progressive lens with umbilic vertical meridian. Because astigmatism is generated by power gradients, such a lens must exhibit the lowest possible power gradient between the poles of the bipolar construction. This is provided by a linear power law, depicted in FIG. 11, and defined by the equation $$\frac{1}{r(u)} = \frac{1}{r_D} + \left(\frac{1}{r_R} - \frac{1}{r_D}\right)(u + L)/h. \quad (31)$$

Figure 12A:
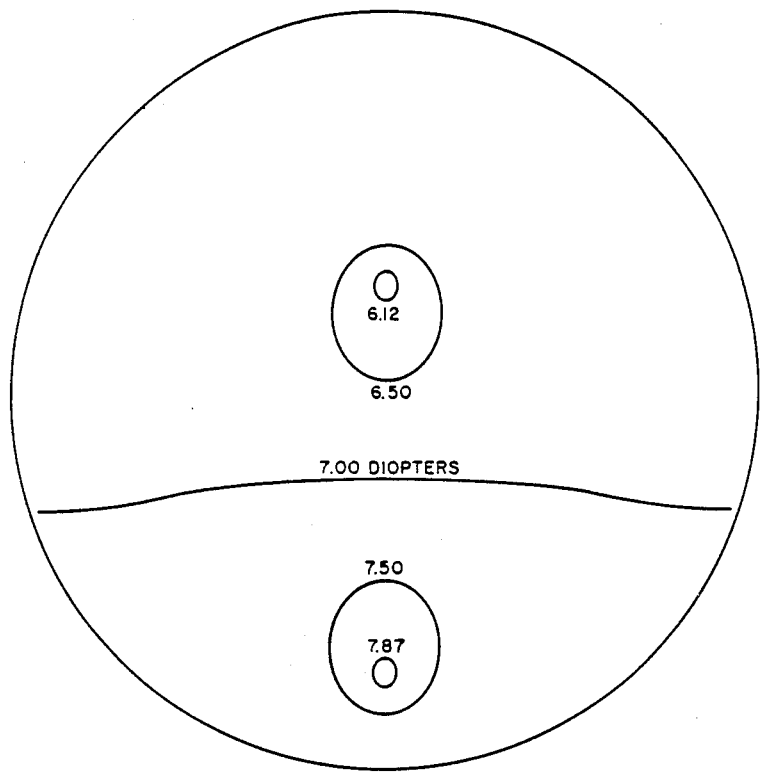
FIG. 12A, 12B and 12C depict, respectively, contours of constant mean surface power, contours of constant surface astigmatism, and an isometric plot of surface astigmatism corresponding to the typical design of FIG. 11.
Figure 12B:
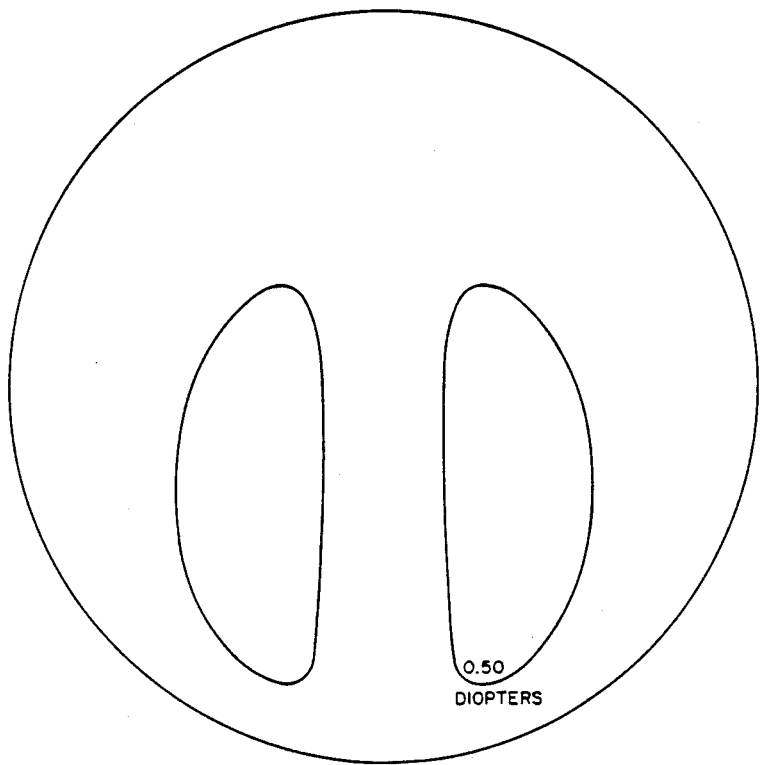
Figure 12C:
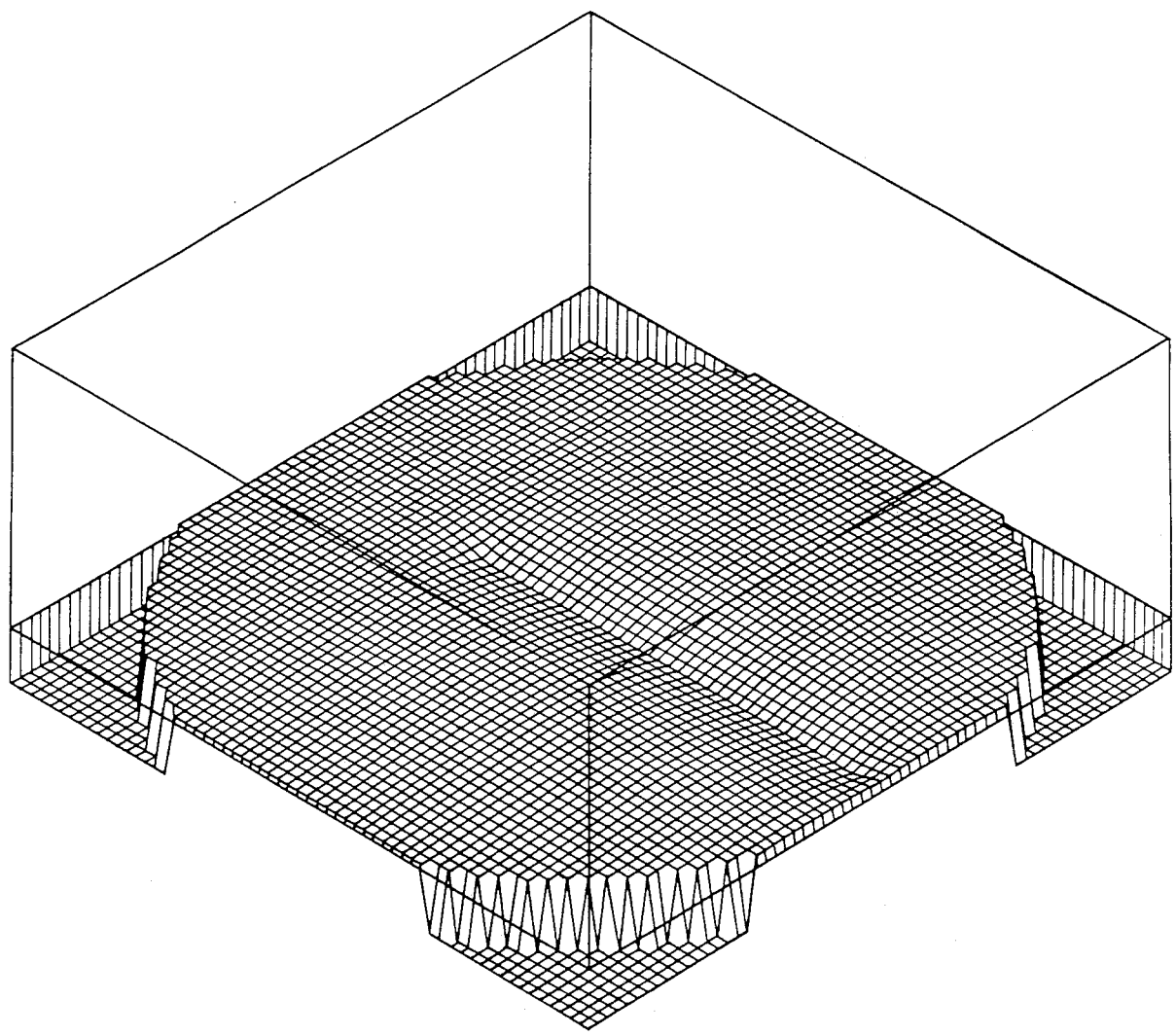

The surface defined by the linear power law will now be evaluated utilizing the values of the parameters given in equation (30). FIG. 12A shows the contours of constant mean surface power; FIG. 12B the contours of constant surface astigmatism; and FIG. 12C a three-dimensional representation of the surface astigmatism. The maximum surface astigmatism is just 0.66 diopters, or ⅓ the add power. This may well represent the minimum value possible in a progressive lens with umbilic vertical meridian, although no proof of the conjecture exists. FIG. 10A shows that the power distribution in the neighborhoods of the DP and RP poles is relatively unstable. For this reason, despite its low level of astigmatism, the lens may not be desirable for general use. It is in fact best suited to visual tasks requiring only a narrow visual field, for example, the computer work station, comprising a keyboard and video display terminal.

For ease of exposition, the general invention as well as the two example lenses have been described as having a vertical line of symmetry. This line runs down the middle of the progressive corridor and divides the lens into two symmetrical halves. In actual practice, however, the symmetry line of the lens must be rotated about 9° from the vertical to provide an effective inset of the near viewing portion. This 9° rotation, which of course is applied to both lenses of a spectacle, ensures that the lines of sight can pass along the progressive corridors for clear vision at all distances.

An important consequence of the low astigmatism characterizing the invention is that binocular vision is not impaired by the 9° rotation. In the case of most prior art lenses, the astigmatism levels are so high that the rotation adversely affects the binocular function, in some cases necessitating the introduction of an asymmetrical design. However, in the case of the present invention, the astigmatism levels are so low, and astigmatism so smoothly distributed, that the incorporation of asymmetry to counteract the effects of the 9° rotation is entirely unnecessary.

It is to be understood that the term "lens" as used herein is intended to include the ophthalmic product in any and all forms common to the art, i.e., including lens blanks requiring second side (concave or convex) finishing as well as lenses finished on both sides and "uncut" or "cut" (edged) to a size and shape required for spectacles frame glazing. The present lenses may be formed of glass or any one of the various known and used ophthalmic plastics. If second side finished, i.e., on the side opposite that having the progressive power surface, the second side may have prescription surface curvatures applied with the lens RP decentered in usual fashion.

Those skilled in the art will readily appreciate that there are many forms and adaptations of the invention not discussed herein which may be made to suit particular requirements. Accordingly, all such forms and adaptations are included within the scope of the invention as defined by the following claims.

I claim:

1. A progressive power ophthalmic lens comprising:
    a lens body with a progressive power surface having a first vision portion and a second vision portion, the power of one of said portions being different than the other;
    at least one of said first and second vision portions being a point surrounded by an area of optical stability in which the power changes gradually but imperceptibly across said area toward said point;
    an intermediate portion of gradually changing power between said point of said one vision portion and the other of said vision portions;
    the form of the progressive surface of said lens being effective to distribute surface astigmatism over substantially the entire surface of the lens from said point of said one vision portion to the other vision portion.

2. A progressive power ophthalmic lens as in claim 1 wherein:
    said contours of successively different means surface powers converge toward said point.

3. A progressive power ophthalmic lens as in claim 1 wherein:
    the surface astigmatism is distributed substantially uniformly over the entire surface of the lens.

4. A progressive power ophthalmic lens as in claim 1 wherein:
    said area of optical stability around said point is effectively spherical.

5. A progressive power ophthalmic lens as in claim 1 wherein the power progression along meridian from said point to said other portion is smooth.

6. A progressive power lens according to claim 5 wherein the mean square gradient of the progression or one of its higher derivatives is a minimum.

7. A progressive power ophthalmic lens as in claim 1 wherein:
   each of said first vision and second vision portions is a point, each of said points being surrounded by an area of optical stability and having a series of contours of successively different constant mean surface powers around the point, said points forming the poles of a bipolar system of coordinate line approximately coincident with isopower contours on the progressive power surface of the lens.

8. A progressive power lens according to claim 7 wherein the progressive power surface comprises the curve of intersection of a sequence of spheres of varying radii and a corresponding sequence of cylinders of varying diameters.

9. A progressive power ophthalmic lens comprising:
   a lens body have a progressive power surface with a reading portion of a first effectively constant power, a distance portion of a second effectively constant power, and an intermediate portion of gradually changing power between the reading portion and the distance portion;
   at least one of said distance and reading portions being defined by an area of optical stability in which the power changes gradually but visually imperceptively around the toward a point;
   the form of the progressive power surface of the lens being effective to distribute surface astigmatism over substantially the entire surface of the lens from said point of said one portion to the other portion.

10. A progressive power ophthalmic lens as in claim 9 wherein:
    the surface astigmatism is distributed substantially uniformly over the entire surface of the lens.

11. A progressive power ophthalmic lens as in claim 9 wherein:
    said area of optical stability around said point is effectively spherical.

12. A progressive power ophthalmic lens as in claim 9 wherein the power progression along a meridian from said point to said other portion is smooth.

13. A progressive power lens according to claim 12 wherein the mean square gradient of the progression or one of its higher derivatives is a minimum.

14. A progressive power ophthalmic lens as in claim 9 wherein:
    each of said reading and distance portions is a point, each of said points being surrounded by an area of optical stability and having a series of contours of successively different constant mean surface powers around the point, said points forming the poles of a bipolar system of coordinate lines approximately coincident with isopower contours on the progressive power surface of the lens.

15. A progressive power lens according to claim 14 wherein the progressive power surface comprises the curve of intersection of a sequence of spheres of varying radii and a corresponding sequence of cylinders of varying diameters.

16. A progressive power ophthalmic lens comprising:
    a body having a progressive power surface with a reading portion and a distance portion, the reading portion being of higher power than the distance portion;
    a progression of contours of constant means surface power extending from the distance portion to the reading portion and increasing in power along the meridian from the distance portion to the reading portion;
    at least one of said distance and reading portions being defined by an area of optical stability wherein successive contours of constant mean surface power converge toward a point; and
    the form of the progressive power surface of the lens being effective to distribute surface astigmatism over substantially the entire surface of the lens from said point of said one portion to the other portion.

17. A progressivepower ophthalmic lens as in claim 16 wherein:
    the surface astigmatism is distributed substantially uniformly over the entire surface of the lens.

18. A progressively power ophthalmic lens as in claim 16 wherein:
    said area of optical stability around said point is effectively spherical.

19. A progressive power lens according to claim 16 wherein the power progression along the meridian is smooth.

20. A progressive power lens according to claim 19 wherein the mean square gradient of the progression or one of its higher derivatives is a minimum.

21. A progressive power ophthalmic lens as in claim 16 wherein:
    each of said reading and distance portions is a point, each of said points being surrounded by an area of optical stability and having a series of contours of successively different constant mean surface powers around the point, said points forming the poles of a bipolar system of coordinate lines approximately coincident with isopower contours on the progressive power surface of the lens.

22. A progressive power lens according to claim 21 wherein the progressive power surface comprises the curve of intersection of a sequence of spheres of varying radii and a corresponding sequence of cylinders of varying diameters.

23. A progressive power ophthalmic lens comprising a lens body having a progressive power surface with a reading portion and a distance portion, the reading portion having a higher power than the distance portion, at least one of said reading and distance portions being defined by an area of optical stability having a series of contours of successively different constant mean surface powers around a point, the power change in said area of optical stability being imperceptible, a meridian of continuous change of power between said distance portion and said reading portion, and the form of the progressive power surface of the lens being effective to distribute surface astigmatism over substantially the entire surface of the lens from the distance portion to the reading portion.

24. A progressive power ophthalmic lens as in claim 23 wherein:
    said contours of successively different mean surface powers converge toward said point.

25. A progressive power ophthalmic lens as in claim 23 wherein:

the surface astigmatism is distributed substantially uniformly over the entire surface of the lens.

26. A progressive power ophthalmic lens as in claim 23 wherein:
said area of optical stability around said point is effectively spherical.

27. A progressive power lens according to claim 23 wherein the power progression along the meridian is smooth.

28. A progressive power lens according to claim 27 wherein the mean square gradient of the progression or one of its higher derivatives is a minimum.

29. A progressive power ophthalmic lens as in claim 23 wherein:
each of said reading and distance portions is a point, each of said points being surrounded by an area of optical stability and having a series of contours of successively different constant mean surface powers around the point, said points forming the poles of a bipolar system of coordinate lines approximately coincident with isopower contours on the progressive power surface of the lens.

30. A progressive power lens according to claim 23 wherein the progressive power surface comprises the curve of intersection of a sequence of spheres of varying radii and a corresponding sequence of cylinders of varying diameters.

31. A progressive ophthalmic power lens comprising a lens body having a progressive power surface with a reading portion of relatively high power and a distance portion of relatively lower power, wherein constant power regions of the reading portion and the distance portion comprise substantially tow spaced points on the progressive power surface of the lens, each of said points being surrounded by an area of optical stability and an area of progressive power, said two spaced points being connected by an umbilic of progressive dioptric power, and the surface being shaped to distribute surface astigmatism over essentially the surface of the lens between said two spaced points.

32. A progressive power lens according to claim 31 wherein said areas of optical stability around said two spaced points are effectively spherical.

33. A progressive power lens according to claim 31 wherein the power progression along the umbilic line is smooth.

34. A progressive power lens according to claim 33 wherein the mean square gradient of the progression or one of its higher derivatives is a minimum.

35. A progressive power lens according to claim 31 wherein the spaced points are the poles of a bipolar system of coordinate lines approximately coincident with isopower contours on the progressive power surface of the lens.

36. A progressive power lens according to claim 31, wherein the progressive power surface comprises the curve of intersection of a sequence of spheres of varying radii and a corresponding sequence of circular cylinders of varying diameters.

37. In a progressive power ophthalmic lens having two refractive surfaces one of which is divided into three viewing zones comprising an upper distance portion, an intermediate progressive portion and a lower near portion, and having a principal vertical meridian defined by a sequence of points traversing said zones, wherein said distance portion is in the upper portion of said lens and provides a focal length for distant vision, wherein said near portion is in a lower portion of said lens and provides a focal length for near vision, and wherein said intermediate progressive portion lies between said distance and near portions and has a varying curvature which increases continuously and progressively along said meridian from a minimum value, which approximates the curvature of said distance portion, to a maximum value, which approximates the curvature of said near portion, the improvement wherein said distance portion and said reading portion each comprise substantially a point surrounded by an area of essentially indiscernible power change and a area of progressive power, and wherein the surface of the progressive portion comprises the curve of intersection of a sequence of spheres of varying radii and a corresponding sequence of cylinders of varying diameters, the surface astigmatism being distributed over substantially said entire surface of the lens between said two spaced points.

38. A progressive power lens comprising a lens body having a progressive power surface defined by the equation $$z = f(x,y) = \zeta(u) - \{r(u)^2 - [x - \xi(u)]^2 - y^2\}^{\frac{1}{2}}$$

where $$\xi(u) = u - r(u) \sin \theta(u),$$

$$\zeta(u) = r(u) \cos \phi(u) + \int_0^u \tan \phi(u) \, du,$$

$$\sin \phi = \int_0^u \frac{du}{r(u)},$$

$$u = \frac{h}{2} - L + g - (\text{sgn } p)(g^2 - h^2/4)^{\frac{1}{2}},$$

$$g = (\tfrac{1}{2})\left(p + \frac{y^2 + h^2/4}{p}\right),$$

$$p = x - \frac{h}{2} + L,$$

$$\frac{1}{r(u)} = \frac{1}{r_D} + \left(\frac{1}{r_R} - \frac{1}{r_D}\right) \sum_{n=1}^{N} c_n (u + L)^n,$$

h = distance between DP and RP poles,
L = distance of DP pole above origin O,
$r_D$ = radius of curvature of the progressive surface at the DP pole,
$r_R$ = radius of curvature of the progressive surface at the RP pole,
$c_n$ = constant coefficients, and
N = order of polynomial power law.

* * * * *